(12) United States Patent
Guleryuz

(10) Patent No.: US 7,120,308 B2
(45) Date of Patent: Oct. 10, 2006

(54) ITERATED DE-NOISING FOR IMAGE RECOVERY

(75) Inventor: Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 775 days.

(21) Appl. No.: 10/229,667

(22) Filed: Aug. 28, 2002

(65) Prior Publication Data

US 2003/0103681 A1    Jun. 5, 2003

Related U.S. Application Data

(60) Provisional application No. 60/333,429, filed on Nov. 26, 2001.

(51) Int. Cl.
*G06K 9/40* (2006.01)

(52) U.S. Cl. .................. 382/254; 382/275; 375/240.27

(58) Field of Classification Search ................ 382/162, 382/232, 254, 274, 275; 375/240.27
See application file for complete search history.

(56) References Cited

U.S. PATENT DOCUMENTS

| | | | |
|---|---|---|---|
| 5,081,690 A * | 1/1992 | Tan ............................ 382/271 |
| 5,751,361 A | 5/1998 | Kim |
| 5,841,477 A | 11/1998 | Kim |
| 5,912,707 A | 6/1999 | Kim |
| 5,936,674 A | 8/1999 | Kim |
| 6,163,868 A | 12/2000 | Kondo et al. |
| 6,263,108 B1 | 7/2001 | Kondo et al. |
| 6,311,297 B1 | 10/2001 | Kondo et al. |
| 6,496,604 B1 | 12/2002 | Bricourt |
| 6,587,592 B1 * | 7/2003 | Georgiev et al. ........... 382/254 |
| 6,636,565 B1 * | 10/2003 | Kim ...................... 375/240.27 |
| 6,862,366 B1 * | 3/2005 | Bhattacharjya ............. 382/164 |
| 2003/0086623 A1 * | 5/2003 | Berkner et al. ............. 382/260 |

FOREIGN PATENT DOCUMENTS

WO    WO 02/096118    11/2002

OTHER PUBLICATIONS

Coifman et al. , "Translation-Invariant De-Noising," Technical Report, Yale University, 1995 (Part of the IDS).*
Chang et al., "Spatially adaptive wavelet thresholding with context modeling for image denoising," IEEE Transactions on Image Processing, V. 9, No. 9, Sep. 2000, pp. 1522-1531 (Part of the IDS).*
"Translation-Invariant De-Noising", R.R. Coifman and D.L. Donoho, Yale University and Stanford University, pp. 1-26.
"Ideal Spatial Adaptation by Wavelet Shrinkage", David L. Donoho, Iain M. Johnstone, Dept. of Statistics, Stanford University, Stanford CA, Jun. 1992, Revised Apr. 1993, pp. 1-30.
"Error Resilient Video Coding Techniques", Real-Time Video Communications over Unreliable Networks, Yao Wang, et al., *IEEE Signal Processing Magazine*, Jul. 2000, pp. 61-82.

(Continued)

*Primary Examiner*—Jingge Wu
*Assistant Examiner*—Yubin Hung

(57) ABSTRACT

An image recovery algorithm that recovers completely lost blocks in an image/video frame using spatial information surrounding these blocks. One application focuses on lost regions of pixels containing textures, edges and other image features that pose problems for other recovery and error concealment algorithms. The algorithm of this invention is based on the iterative application of a generic de-noising algorithm and does not require any complex preconditioning, segmentation, or edge detection steps. Utilizing locally sparse linear transforms and overcomplete de-noising, good PSNR performance is obtained in the recovery of such regions.

30 Claims, 9 Drawing Sheets

OTHER PUBLICATIONS

"A Dual-Tree Complex Wavelet Transform with Improved Orthogonality and Symmetry Properties", Nick Kingsbury, Signal Processing Group, Dept. of Engineering, University of Cambridge, Cambridge UK.

"On the Importance of Combining Wavelet-Based Nonlinear Approximation with Coding Strategies", Albert Cohen, et al., *IEEE Transactions on Information Theory*, vol. 48, No. 7, Jul. 2002, pp. 1895-1921.

"Concealment of Damaged Block Transform Coded Images Using Projections onto Convex Sets", Huifang Sun, et al., *IEEE Transactions on Image Processing*, vol. 4, No. 4, April 1995, pp. 470-477.

"Spatially Adaptive Image Denoising Under Overcomplete Expansion", Xin Li and Michael T. Orchard, Department of Electrical Engineering, Princeton University, *IEEE 2000*, pp. 300-303.

Spatially Adaptive Wavelet Thresholding with Context Modeling for Image Denoising, S. Grace Chang, et al., *IEEE Transactions on Image Processing*, vol. 9, No. 9, Sep. 2000, pp. 1522-1531.

"Error Control and Concealment for Video Communication: A Review", Yao Wang and Qin-Fan Zhu, *Proceedings of the IEEE*, vol. 86, No. 5, May 1998, pp. 974-997.

"De-Noising by Soft-Thresholding", David L. Donoho, *IEEE Transactions on Information Theory*, vol. 41, No. 3, May 1995, pp. 613-627.

"Analysis of Multiresolution Image Denoising Schemes Using Generalized Gaussian and Complexity Priors", Pierre Moulin and Juan Liu, *IEEE Transactions of Information Theory*, vol. 45, No. 3, Apr. 1999, pp. 909-919.

"Interpolation of Missing Data in Image Sequences", Anil C. Kokaram, et al., *IEEE Transactions of Image Processing*, vol. 4, No. 11, Nov. 1995, pp. 1509-1519.

"Information Loss Recovery for Block-Based Image Coding Techniques-A Fuzzy Logic Approach", Xiaobing Lee, et al., *IEEE Transactions on Image Processing*, vol. 4, No. 3, Mar. 1995, pp. 259-273.

"DCT Coefficients Recovery-Based Error Concealment Technique and Its Application to the MPEG-2 Bit Stream Error", Jong Wook Park, et al., *IEEE Transactions on Circuits and Systems for Video Technology*, vol. 7, No. 6, Dec. 1997, pp. 845-854.

"A Parametric Texture Model Based on Joint Statistics of Complex Wavelet Coefficients", Javier Portilla and Eero P. Simoncelli, Center for Neural Science, and Courant Institute of Mathematical Sciences, New York University, New York, NY, International Journal of Computer Vision 40(1), pp. 49-71, 2000.

"Filling-In by Joint Interpolation of Vector Fields and Gray Levels", Coloma Ballester, et al. *IEEE Transactions on Image Processing*, vol. 10, No. 8, Aug. 2001, pp. 1200-1211.

"Nonlinear approximation", Ronald A. DeVore, Department of Mathematics, University of South Carolina, Columbia, SC, *Cambridge University Press*, 1998, pp. 51-150.

"Errorless Restoration Algorithms for Band-Limited Images", Paulo Jorge S. G. Ferreira and Armando J. Pinho, *IEEE*, 1994, pp. 157-161.

Transform Coded Image Reconstruction Exploiting Interblock Correlation, Sheila S. Hemami and Teresa H.-Y. Meng, *IEEE Transactions on Image Processing*, vol. 4, No. 7, Jul. 1995, pp. 1023-1027.

"Combining Frequency and Spatial Domain Information for Fast Interactive Image Noise Removal", Anil N. Hirani, Takashi Totsuka, Sony Corporation.

"Reconstruction of Baseline JPEG Coded Images in Error Prone Environments", Shahram Shirani, et al., *IEEE Transactions on Image Processing*, vol. 9, No. 7, Jul. 2000, pp. 1292-1299.

"Fast DCT-Based Spatial Domain Interpolation of Blocks in Images", Ziad Alkachouh and Maurice G. Bellanger, *IEEE Transactions on Image Processing*, vol. 9, No. 4, Apr. 2000, pp. 729-732.

* cited by examiner

ITERATED DE-NOISING FOR IMAGE RECOVERY

CONTINUING APPLICATION DATA

This application claims the benefit under 35 U.S.C. §119(e) of U.S. Provisional Application No. 60/333,429, filed Nov. 26, 2001.

BACKGROUND OF THE INVENTION

1. Field of the Invention

The present invention relates to algorithms for recovering missing data in a digital signal, and more specifically for predicting lost regions of data in the signal using information surrounding these regions. The algorithms are primarily directed to recovering an image/video-frame by predicting lost regions of pixels in the image/video-frame using spatial information surrounding these regions. The techniques of the algorithms may be embodied in software, hardware or combination thereof and may be implemented on a computer or other processor-controlled device.

2. Description of the Related Art

In many image and video compression applications the decoder frequently has to contend with channel corrupted data and therefore has to resort to image recovery and error concealment algorithms. Throughout the years, many techniques have been proposed that enable decoders to avoid the severe consequences of channel errors. In the case of images, the lost or erroneous data has to be predicted spatially, while for video both temporal and spatial prediction can be attempted. However, previous techniques suffer from various problems, including too many prediction errors, too application, procedure or data coordinate specific, able to handle only certain regions of specific size, shape and/or type of data, limited robustness and/or adaptability, and requiring special information such as motion vectors for video frames.

OBJECTS AND SUMMARY OF THE INVENTION

Objects of the Invention

It is therefore an object of the present invention to overcome the above-mentioned problems.

It is another object of this invention to provide an image recovery technique for recovering lost regions of data in an image/video frame using spatial information surrounding these regions.

SUMMARY OF THE INVENTION

According to one aspect of this invention, a method for recovering missing data in a digital signal is provided. The method comprises the steps of: (a) grouping data elements in at least one region in which at least some data is missing into n layers, where n is an integer greater than or equal to 1; (b) assigning an initial value to each missing data element in the at least one region; and, for each of the n layers: (c)(1) evaluating a plurality of orthogonal transforms over layer n, (c)(2) thresholding, preferably hard-thresholding, select transform coefficients using a threshold, and (c)(3) performing an inverse transform operation to obtain intermediate results of layer n, and (c)(4) performing an averaging operation followed by a clipping operation on the intermediate results of the n layer obtained in (c)(3) to recover layer n.

Preferably, steps (c)(1) through (c)(4) are carried out iteratively on the n layers, such that at each successive iteration the threshold is reduced and steps (c)(1) through (c)(4) are repeated for each of the n layers, so that the n layers are recovered in finer detail at each iteration.

The at least one region in which at least some data is missing may contain at least one of an edge or a texture feature.

In one embodiment, the digital signal is an image or video frame comprised of a plurality of pixels and the at least one region in which at least some data is missing comprises at least some pixels that are missing. All of the pixels from the at least one region may be missing.

The plurality of orthogonal transforms may comprise a discrete cosine transform (DCT) and a predetermined number of its overcomplete shifts, a wavelet transform and a predetermined number of its overcomplete shifts, or a Fourier transform and a predetermined number of its overcomplete shifts. In a preferred embodiment, the DCT transform is used in connection with an image or video signal. A wavelet or Fourier transform may also be used for such signals. For other types of signals (e.g., non-image or non-video signals), a particular transform may provide better results than others, depending on the particular signal. One should utilize transforms that are expected to provide sparse representations on the type of data being processed. Selecting the appropriate transform in such cases will be apparent to one skilled in the art based on the teachings provided herein.

In another aspect, the invention involves an apparatus including one or more components for performing the processing operations described above. Such components may include, for example, a general microprocessor, or one or more application specific integrated circuits (ASICs), digital signal processing circuitry, etc., or a combination thereof.

In accordance with further aspects of the invention, any of the above-described methods or steps thereof may be embodied in a program of instructions (e.g., software) which may be stored on, or conveyed to, a computer or other processor-controlled device for execution. Alternatively, the program of instructions may be integrated with hardware designed to perform one or more of the steps (e.g., one or more ASICs, digital signal processing circuitry, etc.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A. Overview

The image/video-frame recovery algorithms of the present invention are primarily concerned with the recovery of lost data using spatial prediction alone. As such, for video, the techniques of the algorithms are directly applicable in cases in which temporal prediction is either not possible or not prudent, for example, in cases involving severely corrupted motion vectors and/or intra-marked macroblocks in the popular MPEG algorithms. While the algorithms of the present invention are primarily concerned with the recovery of completely lost image/video-frame blocks, the algorithms are not so limited. Rather, the algorithms can be adapted to situations in which partial information is available and the lost data corresponds to non-rectangular or irregularly shaped regions. The algorithms are particularly useful for robust recovery of image/video-frame blocks that contain textures, edges, and other features that pose problems for current methods. While the algorithms take into consideration the importance of visual appearance and uniformity, the algorithms are also adapted to achieve significant peak signal-to-noise ratio $$(PSNR)\left(10 \times \log_{10}\left(\frac{255 \times 255}{meansquarederror}\right)\right)$$

improvements in recovered regions.

Figure 1:
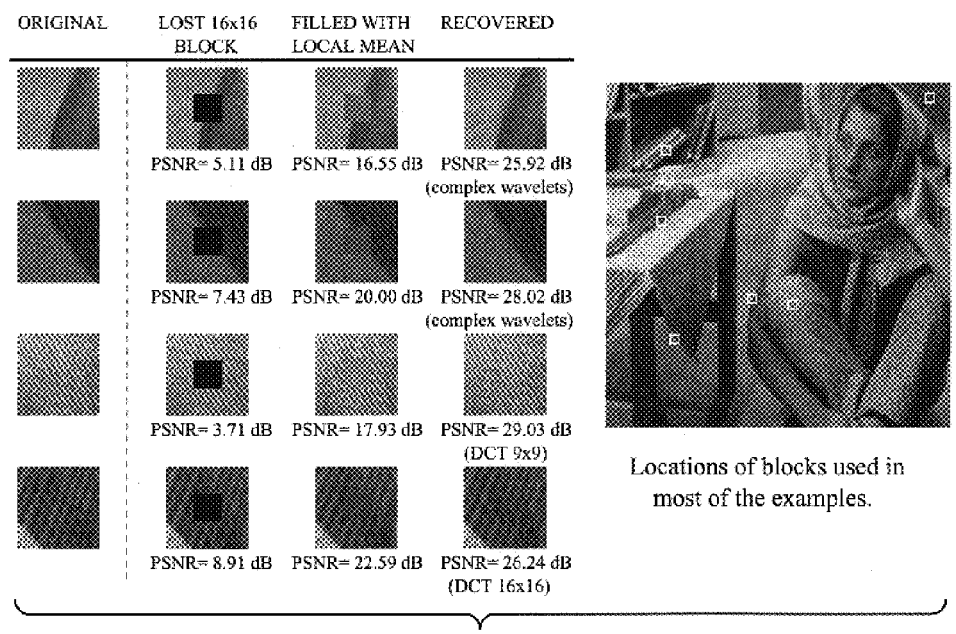
FIG. 1 illustrates some examples of recovery over various regions of the standard image Barbara using the techniques of the present invention.

FIG. 1 illustrates some examples of recovery of 16×16 blocks over various edge and texture regions of the standard image Barbara using the algorithms of this invention.

The main recovery algorithms of this invention are based on de-noising using overcomplete transforms. As is described below, this is a different application of de-noising from that which is conventionally used to combat additive noise. The phrase "de-noising using overcomplete transforms," as used herein, refers to its simplest form where several complete transformations are evaluated over a target area of interest, the transform coefficients are hard-thresholded and inverse transformed to obtain several partially de-noised regions, which are then averaged to obtain the final result. Hard-thresholding a coefficient c yields 0 if |c|<T, and leaves the coefficient unchanged otherwise. Similar to established de-noising techniques, the role of the utilized transformations is very important. Indeed, the underlying operational basis of the algorithms of this invention is sparse image representations with the utilized linear transforms.

The details of the algorithms and other details pertinent to the invention are described below.

B. Algorithms

Figure 2:
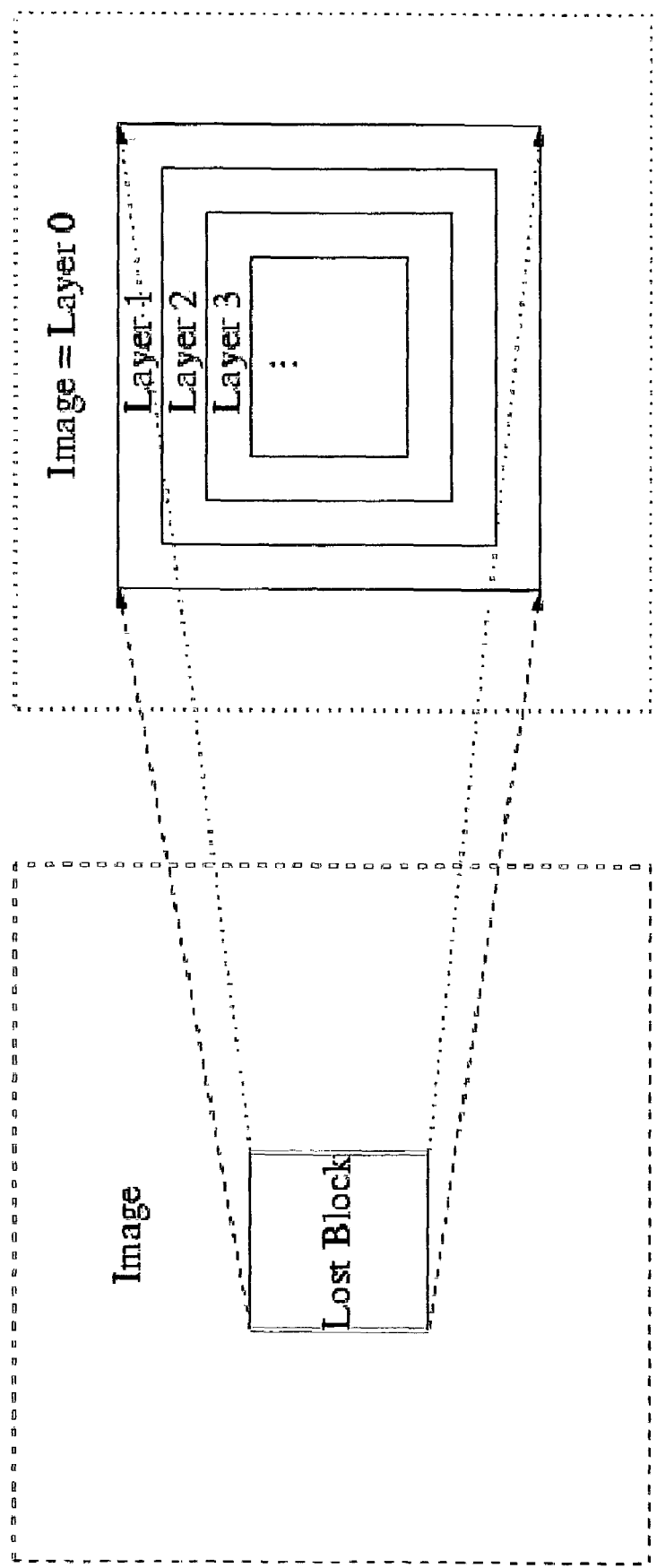
FIG. 2 is a schematic illustration of layers of pixels in the recovery process, where each layer is recovered using the preceding layers surrounding it.
Figure 8:
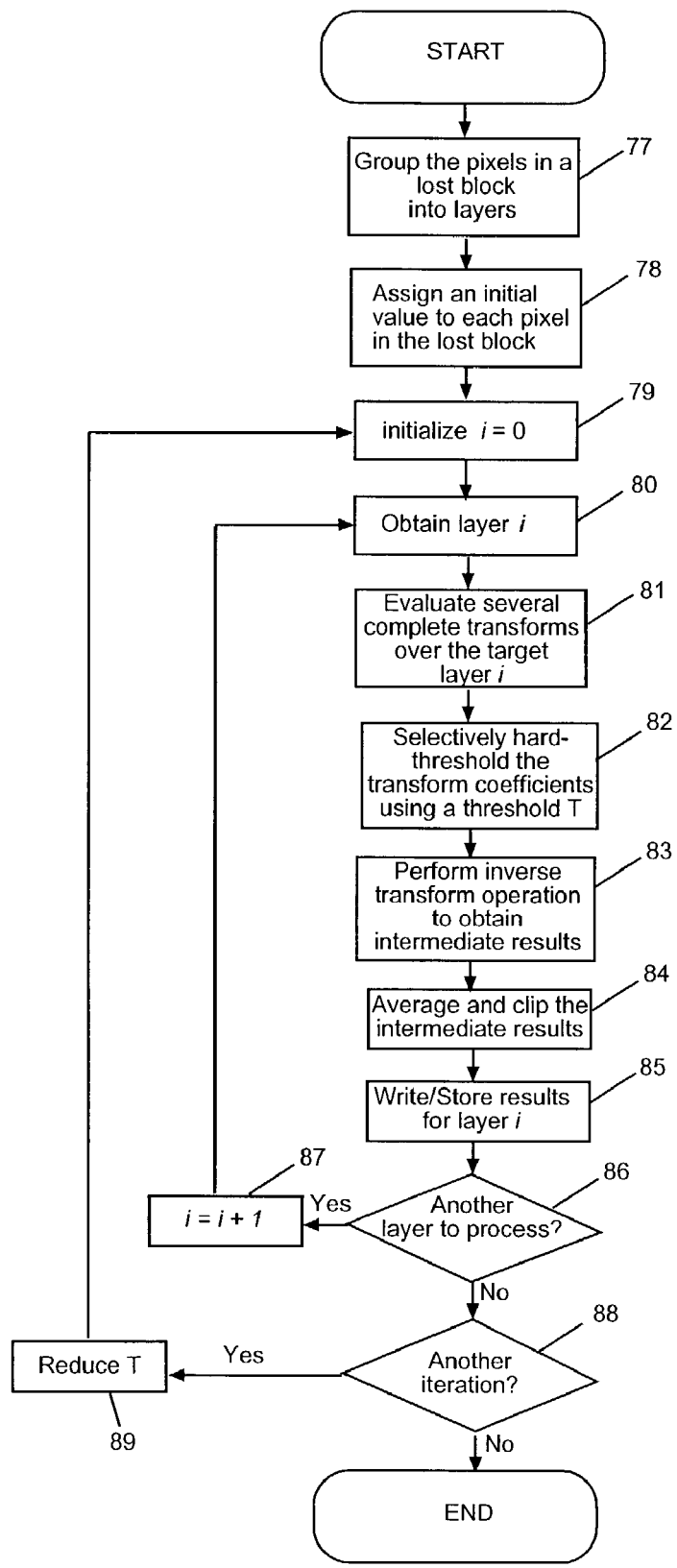
FIG. 8 is a flow chart illustrating the basic process flow of the algorithms of this invention.

Referring to the flow diagram of FIG. 8, the basic algorithm starts by grouping the pixels in a lost block into layers (step 77), as shown in FIG. 2. Layers are recovered in stages with each layer recovered by mainly using the information from the preceding layers, that is, layer 0 is used to recover layer 1, both of which are then used to recover layer 2, and so on. The layer grouping shown in FIG. 2 is exemplary only. Many different groupings are possible, and the one chosen depends on the size and shape of the lost blocks. Prior to the first iteration, each pixel in the lost block is assigned an initial value, for example, the mean value computed from the surroundings of the outer boundary of layer 1 (step 78). Using such a mean value as the initial value is exemplary; alternatively, the initial value may be assigned using another suitable statistical calculation or a fixed constant such as 128 or 0. Next, a layer counting variable i is initialized to 0 in step 79. In step 80, the layer i is obtained. The next main step of the algorithm involves evaluating several complete transforms over the target layer i (step 81). Then, the transform coefficients are selectively hard-thresholded using a threshold T (step 82). Prior to the first iteration T is set to $T_0 > 0$, where $T_0$ may represent, for example, the standard deviation computed from the surroundings of the outer boundary of layer 1. Setting $T_0$ using such a standard deviation is exemplary; alternatively, $T_0$ may be computed using another suitable statistical calculation or set to a fixed constant such as 128 or 256. In step 83, an inverse transform operation is performed to generate intermediate results, and in step 84, the intermediate results are averaged and clipped to obtain the final recovered layer i. The results for this just-processed layer i are then stored or written into memory in step 85. Steps 81–85 are performed on each layer using the same threshold T to generate de-noised results for all layers. Thus, in step 86, it is determined if there is another layer to process. If so, i is incremented in step 87, and the algorithm returns to step 80 where the next layer is obtained.

In accordance with a preferred embodiment, steps 80–85 are carried out iteratively on the layers, where at each iteration the threshold used in step 82 is reduced and the layers are recovered in finer detail using the new threshold. Thus, in step 88 a decision is made as to whether another iteration is to be carried out. If so, the algorithm proceeds to step 89 where T is reduced and then returns to step 79, at which point the process is started over again. If the decision in step 88 is that no further iterations are to be carried out, the basic algorithm terminates.

Figure 3:
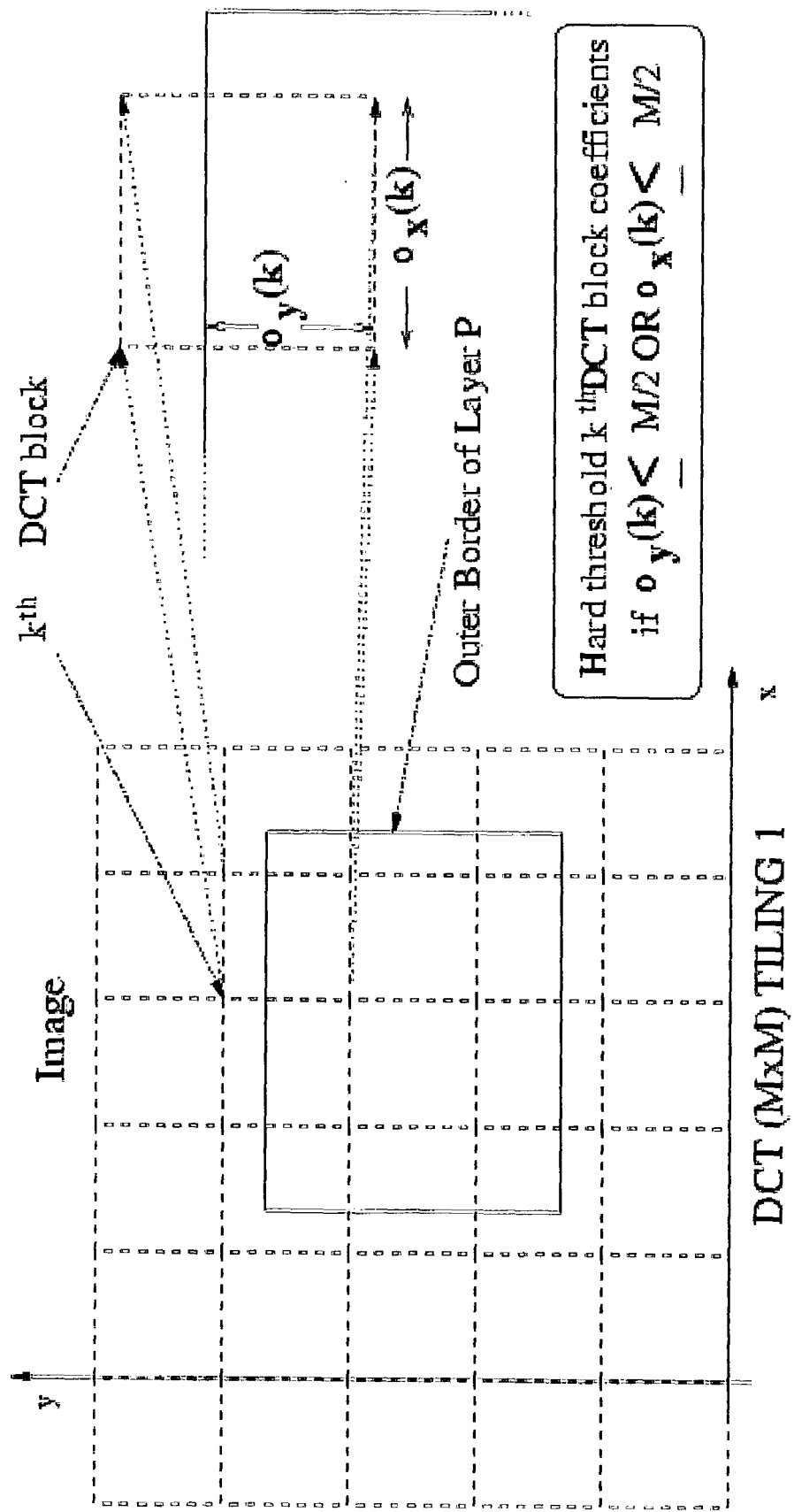
FIG. 3 is a diagrammatic illustration of DCT tiling and selective hard-thresholding, according to embodiments of the invention.
Figure 4:
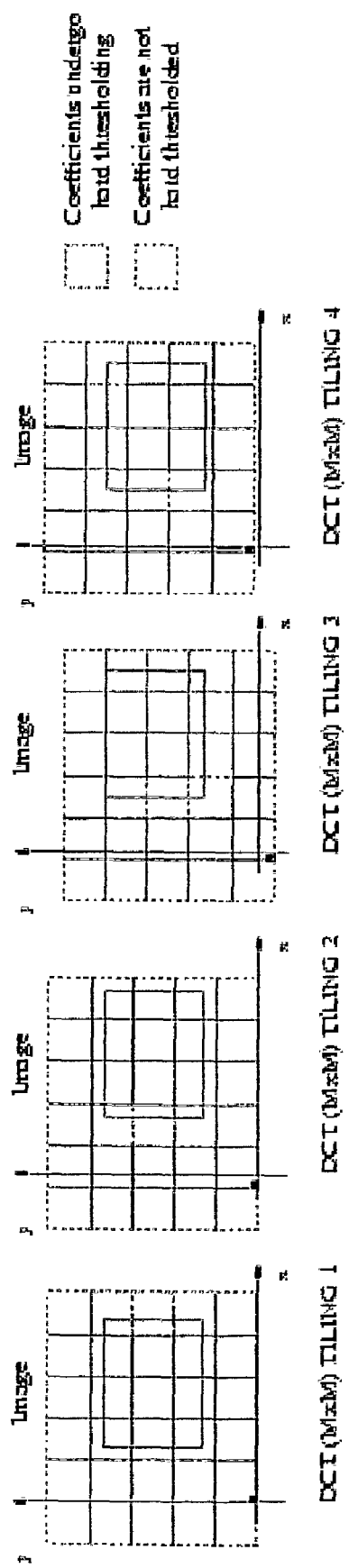
FIGS. 4(a), 4(b), 4(c) and 4(d) are diagrammatic illustrations of DCT tiling and selective hard-thresholding for some other exemplary overcomplete shifts of the M×M DCT.

As discussed below, de-noising by hard-thresholding is an "energy dissipating" operation, which makes the success of the algorithms dependent on layering and the selective application of hard-thresholding. Fix an initial threshold $T = T_0 > 0$ (for example, the standard deviation computed from the surroundings of the outer boundary of layer 1) and consider the recovery of layer P using this threshold, i.e., consider the stage of the algorithm where layer P pixels will be recovered using the threshold T while keeping the remaining pixels unchanged. For the sake of simplicity, assume that an M×M DCT and its $M^2 - 1$ overcomplete shifts will be used in the de-noising operation. In recovering layer P, assume that all pixels in the image that are not in layer P, i.e., all pixels that are in preceding and subsequent layers, have fixed values. Suppose that the initial DCT corresponds to "DCT (M×M) TILING 1" in FIG. 3. Start by evaluating the DCT coefficients. Then for each DCT block determine whether this block overlaps layer P. If there is no overlap, then hard-thresholding of the coefficients of this block is not carried out. If there is overlap, calculate the extent of the overlap with the outer border of layer P in the x and y directions to yield $o_x(k)$ and $o_y(k)$ for the $k^{th}$ DCT block (FIG. 3). If $o_x(k) \leq M/2$ or $o_y(k) \leq M/2$ then the coefficients of the $k^{th}$ DCT block are hard-thresholded. After this selective hard-thresholding inverse transform to generate the first, partially de-noised, layer P of pixels. Repeat this operation for the remaining $M^2-1$ overcomplete transforms, each generating a partially de-noised result for the pixels in layer P. FIGS. 4(a)–4(d) illustrate selective hard-thresholding for some other example overcomplete shifts of the M×M DCT. The final result for layer P is obtained by averaging the partial results followed by clipping the layer pixels to the valid pixel value range (0–255 for grayscale images). Of course, not all DCT coefficients need to be evaluated to generate the final result.

After generating de-noised results for all layers starting with layer 1 using the threshold T, the threshold is reduced (T→T−ΔT) and the whole process is repeated with the reduced threshold. The algorithm terminates when T reaches a pre-selected final threshold $T_F$. The selection of thresholds is done according to the following guidelines: $T_0$ is selected so that it is approximately proportional to the standard deviation of the error in the pixels to be recovered (for example, the standard deviation computed from the surroundings of the outer boundary of layer 1). The final threshold $T_F$ is selected so that it is approximately proportional to the standard deviation of the unpredictable components in the region of image or video-frame under consideration. For example if an image contains some additive white noise (due to capture devices or some other noise generating phenomenon), $T_F$ can be set as the standard deviation of this noise. $T_F=5$ or $T_F=6$ are typical settings in such scenarios. ΔT can be set in terms of the number of desired iterations $d_n$ as $(T_0-T_F)/d_n$. For good quality results $d_n>100$ and ΔT=0.1 or ΔT=0.2 are typical choices. Most of the improvements of the algorithm are generally in the first few iterations and for intermediate quality results $d_n<100$ can be chosen.

Note that it is possible to consider only a subset of the overcomplete shifts and/or utilize different transforms. For other transforms, such as wavelets, wavelet packets, etc., the operation of the algorithm is the same, except that the accounting for the overlap calculations becomes slightly more involved during selective hard-thresholding. Since these transforms have basis functions of varying support for each coefficient (depending on the band), it is prudent to use the support and location of the transform basis function resulting in the particular coefficient during the selective thresholding of that coefficient.

C. De-Noising Using Thresholding and Recovery

De-noising using thresholding and overcomplete transforms is an established signal processing technique primarily used to combat additive noise that is assumed to be uncorrelated to the signal of interest. A lost block can be viewed as a result of a particular noise process acting on the original image. However, unlike the traditional case, this noise process is not uncorrelated with the original image. Regardless, the basic intuition behind de-noising carries forward to the present algorithm, which keeps transform coefficients of high signal-to-noise ratio $$\left(SNR = 10 \times \log_{10}\left(\frac{signal\,energy}{mean\,squared\,error}\right)\right)$$

while zeroing out coefficients having lower SNR.

Let c denote a transform coefficient of the original image and let ĉ be the corresponding coefficient in the noisy image, i.e., the image containing the missing block. Thus, $$\hat{c}=c+e \tag{1}$$

where e denotes the noise. Observe that $$\hat{c}^2=c^2+2ce+e^2 \leq c^2+2|c||e|+e^2 \tag{2}$$

The variances, assuming zero mean random variables, can be expressed as $$\sigma_{\hat{c}}^2=\sigma_c^2+2E[ce]+\sigma_e^2 \leq \sigma_c^2+2\sigma_c\sigma_e+\sigma_e^2 \tag{3}$$

The difference from the traditional case manifests itself in the non-zero correlation term, E[ce], in Eq. (3). The primary assumption underlying the algorithms of this invention is that the linear transformation used to generate the transform coefficients mostly ensures that if c is hard-thresholded to zero with T~$\sigma_e$, then with high probability |c|<<|e|, i.e., hard-thresholding ĉ removes more noise than signal. The algorithms described in section B above makes changes to the lost block by means of the transform coefficients hard-thresholded to zero. Hence, in the preferred operation of the algorithm, a transformation that typically generates many small valued transform coefficients over image regions of interest is needed, i.e., sparse representations of images by the utilized transforms is needed. However, in addition to sparse image representation, obtaining other characteristics from the utilized transform are also important in correct recovery, depending on the region surrounding the lost block.

Assuming that portion of the noise is eliminated after the initial recovery of the layers, the threshold is lowered in order, to make further improvements in recovery. Arrange the noisy image into a vector x (N×1), and let $H_1, H_2, \ldots H_n$ (N×N) denote the orthonormal, overcomplete transformations utilized in the de-noising. Let $G=[H_1, H_2 \ldots H_n]$ (N×nN) denote the compound transformation. The de-noised image with respect to these transformations is then given by $$\frac{1}{n}GSG^T x \tag{4}$$

where S(nN×nN) is a diagonal "selection matrix" of zeros and ones, indicating which coefficients are hard-thresholded to zero. Since the coefficient magnitudes are non-increasing after multiplication with S, it is clear that de-noising cannot increase signal energy, and it is in general "energy dissipating." A straightforward consequence of this is that the symmetric, positive semi-definite matrix $GSG^T$ has all of its eigenvalues between zero and one.

Let $P_1$ denote the projection to layer 1, i.e., the ith component of $P_1x$ is equal to the $i^{th}$ component of x if it is in layer 1, and is equal to zero otherwise. Then the image after the algorithm is run for the first time for layer 1 is given by $$D_{1,T}x = (1 - P_1)x + \frac{1}{n}P_1 G S_{1,T} G^T x \quad (5)$$

where the subscript is introduced to keep track of the layer and the threshold used in the hard-thresholding. Note that while the general de-noising process in Eq. (4) is energy dissipating, the algorithms of this invention do not have this property due to the projections in Eq. (5), i.e., since de-noising is only allowed to affect a layer at a time, the pixel values in this layer can have increased energy without the consequence of having decreased energy at the remaining pixels.

D. Transform Properties

In addition to a sparse image representation by the utilized transform, other characteristics are also desirable for improved operation of the algorithm.

D.1. Performance Over Periodic Features

Figure 5:
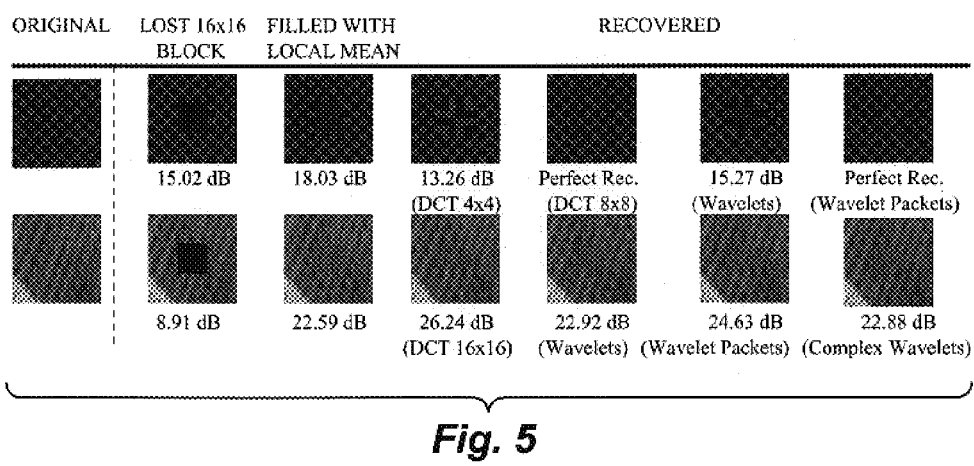
FIG. 5 shows examples of recovery over periodic features using algorithms of the present invention.

Consider a locally periodic region surrounding the lost block. The principles articulated here can be straightforwardly extended to the random setting by using cyclostationary processes. In this case, the transform should have sufficient size to deduce the periodicity the surroundings. Since spatial periodicity by ~S in a given direction implies frequency components separated by ~1 s in the corresponding direction, the utilized transform should have the corresponding frequency selectivity. This is confirmed in FIG. 5, which shows examples of recovery using the present algorithm, especially on the recovery of the artificially generated pattern (periodic by 8 pixels), shown on the top row, which is recovered perfectly with 8×8 DCTs and wavelet packets. The bottom row of FIG. 5 shows an example of recovery from a region from the standard image Barbara.

D.2. Performance Over Edges

Figure 6:
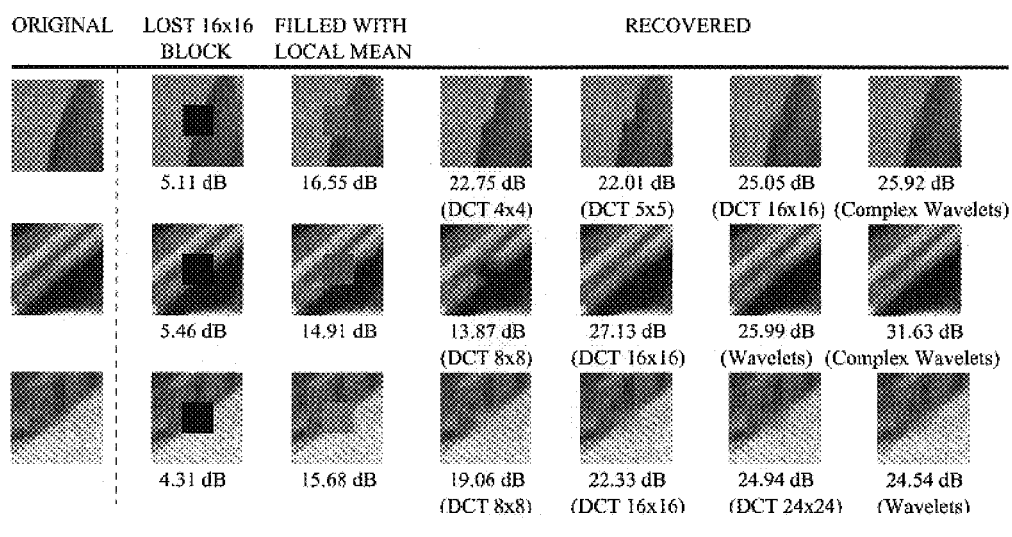
FIG. 6 shows examples of recovery over edge regions using algorithms of the present invention.

Suppose the lost block is over two constant valued regions separated by a line. In this case, the utilized transformation should have sufficient size to determine the slope of the line and its intersection with the lost block, preferably with directional sensitivity such as that provided by complex wavelets. Note that over constant regions, even very small sized DCTs will provide sparse representations but they will lack the ability to correctly interpolate the separating line as illustrated in the first set of simulations in FIG. 6 for 4×4 and 5×5 DCTs, and in the second set for 8×8 DCTs. For wavelets and DCTs, the inventor has observed good performance over edge regions, primarily when edges are horizontal, vertical and at ±45° diagonals. Directional sensitivity of complex wavelets and frequency selectivity of large DCTs seem to provide an advantage in other cases.

E. Spatial Predictability and Thresholds

Figure 7:
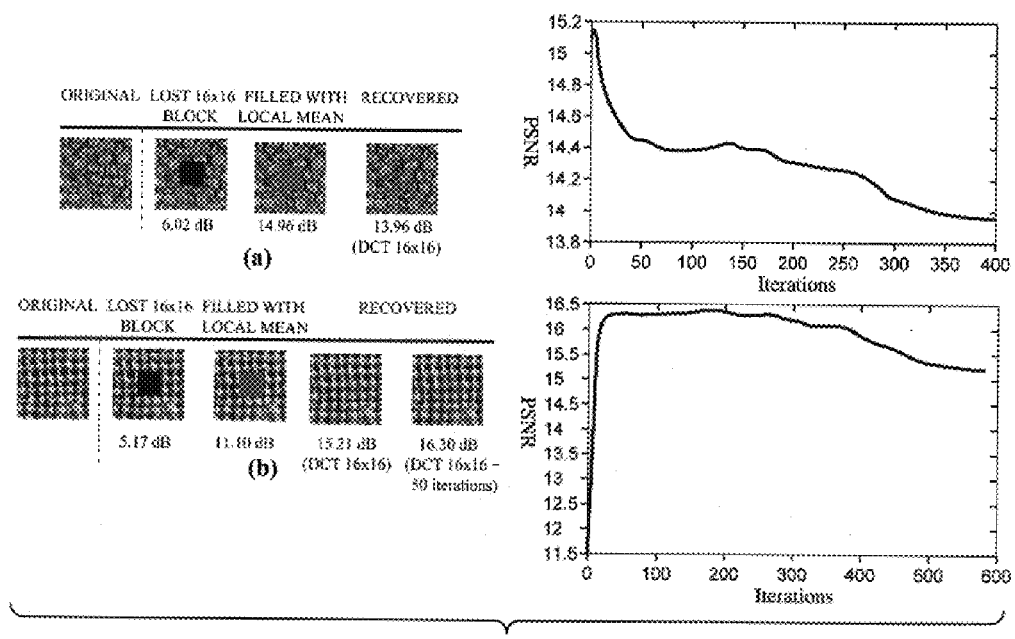
FIG. 7(*a*) illustrates an example of spatial predictability where recovery is not successful, and FIG. 7(*b*) illustrates an example of spatial predictability where recovery is successful but spatially unpredictable details added at later iterations reduce performance.

As illustrated in FIG. 7(a) in cases where the spatial surroundings do not provide enough clues about the distribution of pixels in the lost block, the present algorithms have a less favorable PSNR performance. However, predictability also has an implicit effect even under more favorable circumstances as shown in FIG. 7(b). Observe that the PSNR performance of the algorithms are degraded beyond a certain point, where with reduced thresholds the algorithms try to recover detail components. As can be seen, the added detail beyond iteration 50 is mostly noise-like and appears to be spatially unpredictable. In such cases, the final threshold $T_F$ must be chosen in a way to avoid this problem as earlier outlined.

Note that even in partially or fully unpredictable cases the visual quality of the recovered regions is very good and these regions are visually consistent with their surroundings.

F. Simulation Details

The main algorithm described above has been used with different transforms as follows: all wavelet transforms are evaluated to 4 levels, including wavelet packets (full tree) and complex wavelets. The (complex) wavelet transforms are fully overcomplete at the first level, and critically decimated thereafter, resulting in 4×redundancy. DCT based results are fully overcomplete. Because of the choice of rectangular shells as layers, and the nature of the iterations, four-fold symmetry (left-right/up-down/diagonal) becomes important. While DCTs already have such a symmetry built in to the basis functions and the utilized complex wavelets lead to four-fold symmetry by construction, the orthogonal wavelet banks (Daubechies 8-tap) do not possess such a symmetry. For orthogonal wavelet banks the algorithm has been thus modified to repeat the computations for each layer four times, averaging the results of the regular and the left-right/up-down/diagonal flipped versions of relevant image regions. In all simulations the initial threshold was set as the standard deviation of pixels making up the one pixel boundary immediately outside layer 1. The final threshold $T_F=5$ and $\Delta T=0.1$ throughout, except for the rightmost image in FIG. 7(b), which shows the result after only 50 iterations. Magnitudes of complex wavelet coefficients are thresholded. Typically, most PSNR improvements are obtained in the initial iterations.

The algorithms of the present invention are particularly effective on locally uniform regions and exhibit good robustness to edges. The algorithms' performance over smooth regions is also very favorable. Over uniform regions, transforms with good frequency selectivity are preferred while over edge-separated regions directional sensitivity of the utilized transform also becomes important. By only changing one layer at a time with suitable buffering and updating of transform coefficients, the algorithms advantageously offer significant savings in computation. By employing the iterative use of de-noising and projection onto layers, the algorithms of the present invention perform a sequence of alternating, adaptive projections and are thus substantially different from previous approaches, since the operation of the present algorithms cannot be simplified to a sequence of projections onto fixed, data-independent, convex or non-convex sets.

G. Implementations and Applications

Figure 9:
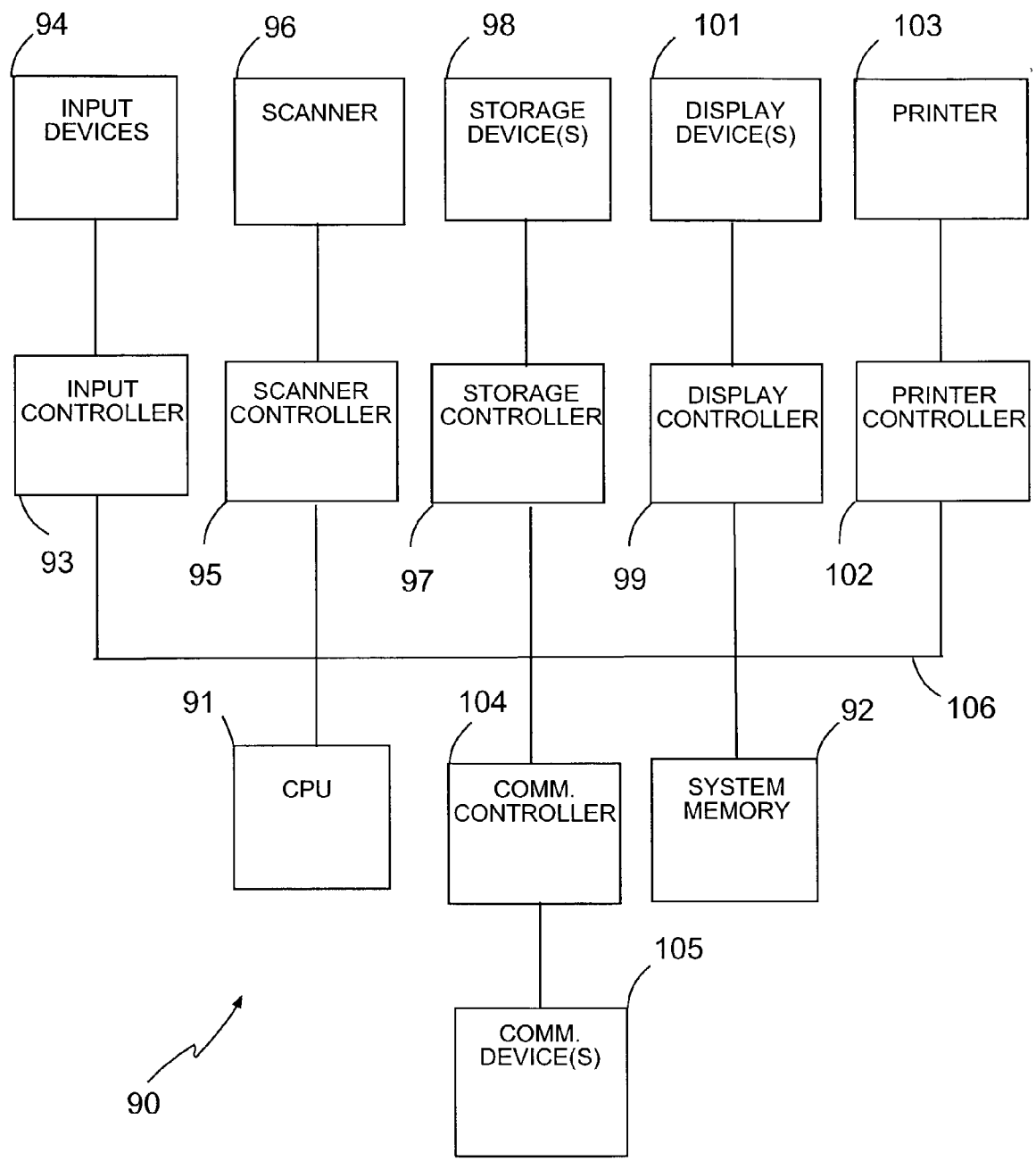
FIG. 9 is a block diagram illustrating an exemplary system which may be used to implement the techniques of the present invention.

FIG. 9 illustrates an exemplary system 90 which may be used to implement the techniques of the present invention. As illustrated in FIG. 9, the system includes a central processing unit (CPU) 91 that provides computing resources and controls the computer. CPU 91 may be implemented with a microprocessor or the like, and may also include a graphics processor and/or a floating point coprocessor for mathematical computations. System 90 further includes system memory 92 which may be in the form of random-access memory (RAM) and read-only memory (ROM).

A number of controllers and peripheral devices are also provided, as shown in FIG. 9. Input controller 93 represents an interface to various input devices 94, such as a keyboard, mouse or stylus. There is also a controller 95 which communicates with a scanner 96 or equivalent device for digitizing documents including images or representations to be processed in accordance with the invention. A storage controller 97 interfaces with one or more storage devices 98 each of which includes a storage medium such as magnetic tape or disk, or an optical medium that may be used to record programs of instructions for operating systems, utilities and applications which may include embodiments of programs that implement various aspects of the present invention. Storage device(s) 98 may also be used to store processed or data to be processed in accordance with the invention. A display controller 99 provides an interface to a display device 101 which may be a cathode ray tube (CRT) or thin film transistor (TFT) display. A printer controller 102 is also provided for communicating with a printer 103 for printing documents including images or representations processed in accordance with the invention. A communications controller 104 interfaces with one or more communication devices 105 which enables system 90 to connect to remote devices through any of a variety of networks including the Internet, a local area network (LAN), a wide area network (WAN), or through any suitable electromagnetic carrier signals including infrared signals.

In the illustrated system, all major system components connect to bus 106 which may represent more than one physical bus. However, depending on the particular application of the invention, various system components may or may not be in physical proximity to one another. For example, the input data and/or the output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. As such, the term device-readable medium further includes hardware having a program of instructions hardwired thereon. With these implementation alternatives in mind, it is to be understood that the figures and accompanying description provide the functional information one skilled in the art would require to write program code (i.e., software) or to fabricate circuits (i.e., hardware) to perform the processing required.

As the foregoing demonstrates, the present invention provides software- or hardware-based algorithms/techniques for predicting lost regions of data in an image or video frame based on de-noising using thresholding and linear transforms with sparse image representations. The algorithms have a broad range of applications including error concealment for encoded images and video that have errors during network transmission, recovery of damaged images, scratch removal, etc. The algorithms are directly applicable in cases where temporal prediction is not possible or prudent, for example, in cases involving severely corrupted motion vectors and/or intra-marked macroblocks in the popular MPEG schemes.

The algorithms of the present invention are not specific to lost regions of any particular size, shape or data type and can operate on regions where the data is partially or completely lost. The algorithms can be extended to nonrectangular regions and can also be used for larger regions than 16×16. Moreover, while application to images and video frames (i.e., 2-D data) is the primary focus of the algorithms, they are not so limited. Rather, the algorithms are readily adaptable to 1-, 3-, 4-D, and even higher dimensional data. For example, the algorithms could be used to fill in missing segments of speech or audio data. The algorithms do not require any special procedures for application. The algorithms can operate on any image, video frame, signal, etc. to predict the missing data therein. How the missing data came to be missing is irrelevant to the operation of the algorithms. For example, the algorithms do not require special measures to be taken or overhead information sent during the encoding stage in an error concealment application.

For image and video frames, the algorithms of the present invention can easily handle cases where the missing data extends over smooth regions, texture regions, high frequency regions, edge regions, periodic regions, and very advantageously over any combination thereof. That is, the missing data does not have to be over "exactly texture" regions, "exactly periodic" regions, etc. If the missing data is over regions that are "approximately texture," "approximately periodic," etc. the algorithms will still work. The same is true for non 2-D data. Thus, the algorithms of the present invention are quite versatile, particularly in comparison with conventional techniques.

In addition to being versatile, the algorithms of this invention are robust. Not only can the algorithms handle various types of data regions, they also do not require input instructions as to what type of region they are operating on. Thus, the algorithms do not employ, nor do they need, a separate step that detects edges, periodic regions, smooth regions, textures, etc. This is also quite advantageous in that the detection of a particular type of region from several others has errors and problems in its own right, and by not employing such a step the algorithms avoid such issues. Instead, the algorithms are adaptive. The algorithms discover what type of region is being operated on and predict the missing data accordingly.

The algorithms of the present invention can be readily extended to cases where the data is in another coordinate system. That is, in addition to their use at predicting missing pixel values, the algorithms can be generalized to predict missing coefficients of various transforms, such as missing DCT, wavelet, or Fourier transform coefficients.

The algorithms of the present invention not only make the visual appearance of each predicted/recovered region consistent with its surroundings, they also produce very low prediction errors. For example, with some conventional techniques, the filled in missing data may be visually acceptable, but an objective measure of performance, such as evaluating the mean-squared-error between the prediction and the original, may yield arbitrarily bad results. The algorithms of the present invention typically result in low mean-squared-error. The algorithms can even recover "anti-aliasing" blur on edges that is present on real world images.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A method for recovering missing data in a digital signal, comprising the steps of:
   (a) grouping data elements in at least one region in which at least some data is missing into n layers, where n is an integer greater than or equal to 1;
   (b) assigning an initial value to each missing data element in the at least one region and a threshold which is the standard deviation computed from the surrounding of the outer boundary of layer 1; and (c) for i=1 to n
  (c)(1) evaluating a plurality of orthogonal transforms over layer i
  (c)(2) thresholding selected transform coefficients using the threshold,
  (c)(3) performing an inverse transform operation to obtain intermediate results of layer i, and
  (c)(4) performing an averaging operation followed by a clipping operation on the intermediate results of layer i obtained in (c)(3) to recover layer i.

2. The method of claim 1, wherein steps (c) through (c)(4) are carried out iteratively, such that at each successive iteration the threshold in step (c)(2) is reduced.

3. The method of claim 2, wherein the threshold is reduced by a predetermined value at each succeeding iteration.

4. The method of claim 1, wherein the thresholding comprises hard-thresholding.

5. The method of claim 1, wherein the at least one region in which at least some data is missing contains at least one of an edge or a texture feature.

6. The method of claim 1, wherein the plurality of orthogonal transforms comprises a discrete cosine transform and a predetermined number of its overcomplete shifts.

7. The method of claim 1, wherein the plurality of orthogonal transforms comprises a wavelet transform and a predetermined number of its overcomplete shifts.

8. The method of claim 1, wherein the plurality of orthogonal transforms comprises a Fourier transform and a predetermined number of its overcomplete shifts.

9. The method of claim 1, wherein the digital signal is an image or video frame comprised of a plurality of pixels and the at least one region in which at least some data is missing comprises at least some pixels that are missing.

10. The method of claim 9, wherein all of the pixels from the at least one region are missing.

11. An apparatus for recovering lost regions in a digital representation, the apparatus comprising one or more components configured to:
  (a) group data elements in at least one region in which at least some data is missing into n layers, where n is an integer greater than or equal to 1;
  (b) assign an initial value to each missing data element in the at least one region and a threshold which is the standard deviation computed from the surroundings of the outer boundary of layer 1; and
  (c) for i=1 to n
    (c)(1) evaluate a plurality of orthogonal transforms over layer i
    (c)(2) threshold selected transform coefficients using the threshold,
    (c)(3) perform an inverse transform operation to obtain intermediate results of layer i, and
    (c)(4) perform an averaging operation followed by a clipping operation on the intermediate results of layer i obtained in (c)(3) to recover layer i.

12. The apparatus of claim 11, wherein operations (c) through (c)(4) are carried out iteratively, such that at each successive iteration the threshold in (c)(2) is reduced.

13. The apparatus of claim 12, wherein the threshold is reduced by a predetermined value at each succeeding iteration.

14. The apparatus of claim 11, wherein the threshold operation comprises hard-thresholding.

15. The apparatus of claim 11, wherein the at least one region in which at least some data is missing contains at least one of an edge or a texture feature.

16. The apparatus of claim 11, wherein the plurality of orthogonal transforms comprises a discrete cosine transform and a predetermined number of its overcomplete shifts.

17. The apparatus of claim 11, wherein the plurality of orthogonal transforms comprises a wavelet transform and a predetermined number of its overcomplete shifts.

18. The apparatus of claim 11, wherein the plurality of orthogonal transforms comprises a Fourier transform and a predetermined number of its overcomplete shifts.

19. The apparatus of claim 11, wherein the digital signal is an image or video frame comprised of a plurality of pixels and the at least one region in which at least some data is missing comprises at least some pixels that are missing.

20. The apparatus of claim 19, wherein all of the pixels from the at least one region are missing.

21. A machine-readable medium having a program of instructions for directing a machine to perform a process of recovering lost regions in a digital representation, the program comprising:
  (a) instructions for grouping data elements in at least one region in which at least some data is missing into n layers, where n is an integer greater than or equal to 1;
  (b) instructions for assigning an initial value to each missing data element in the at least one region and a threshold which is the standard deviation computed from the surroundings of the outer boundary of layer 1; and
  (c) instructions for performing the following operations:
    for i=1 to n
    (c)(1) evaluating a plurality of orthogonal transforms over layer i
    (c)(2) thresholding selected transform coefficients using the threshold,
    (c)(3) performing an inverse transform operation to obtain intermediate results of layer i, and
    (c)(4) performing an averaging operation followed by a clipping operation on the intermediate results of layer i obtained in (c)(3) to recover layer i.

22. The machine-readable medium of claim 21, wherein the program further comprises instructions for carrying out the instructions of (c) through (c)(4) iteratively, such that at each successive iteration the threshold in (c)(2) is reduced.

23. The machine-readable medium of claim 22, wherein the instructions for reducing the threshold comprise instructions for reducing the threshold by a predetermined value at each succeeding iteration.

24. The machine-readable medium of claim 21, wherein the instructions for thresholding comprises instructions for hard-thresholding.

25. The machine-readable medium of claim 21, wherein the at least one region in which at least some data is missing contains at least one of an edge or a texture feature.

26. The machine-readable medium of claim 21, wherein the plurality of orthogonal transforms comprises a discrete cosine transform and a predetermined number of its overcomplete shifts.

27. The machine-readable medium of claim 21, wherein the plurality of orthogonal transforms comprises a wavelet transform and a predetermined number of its overcomplete shifts.

28. The machine-readable medium of claim 21, wherein the plurality of orthogonal transforms comprises a Fourier transform and a predetermined number of its overcomplete shifts.

29. The machine-readable medium of claim 21, wherein the digital signal is an image or video frame comprised of a plurality of pixels and the at least one region in which at least some data is missing comprises at least some pixels that are missing.

30. The machine-readable medium of claim 29, wherein all of the pixels from the at least one region are missing.

* * * * *

UNITED STATES PATENT AND TRADEMARK OFFICE
CERTIFICATE OF CORRECTION

PATENT NO. : 7,120,308 B2  Page 1 of 1
APPLICATION NO. : 10/229667
DATED : October 10, 2006
INVENTOR(S) : Onur G. Guleryuz It is certified that error appears in the above-identified patent and that said Letters Patent is hereby corrected as shown below:

Column 10, line 66, change "surrounding" to --surroundings--

Signed and Sealed this

Thirtieth Day of January, 2007

JON W. DUDAS
*Director of the United States Patent and Trademark Office*